July 5, 1938.  E. PICK  2,122,824
HARDNESS TESTING IN WATER SOFTENERS
Filed Nov. 22, 1935  4 Sheets-Sheet 1
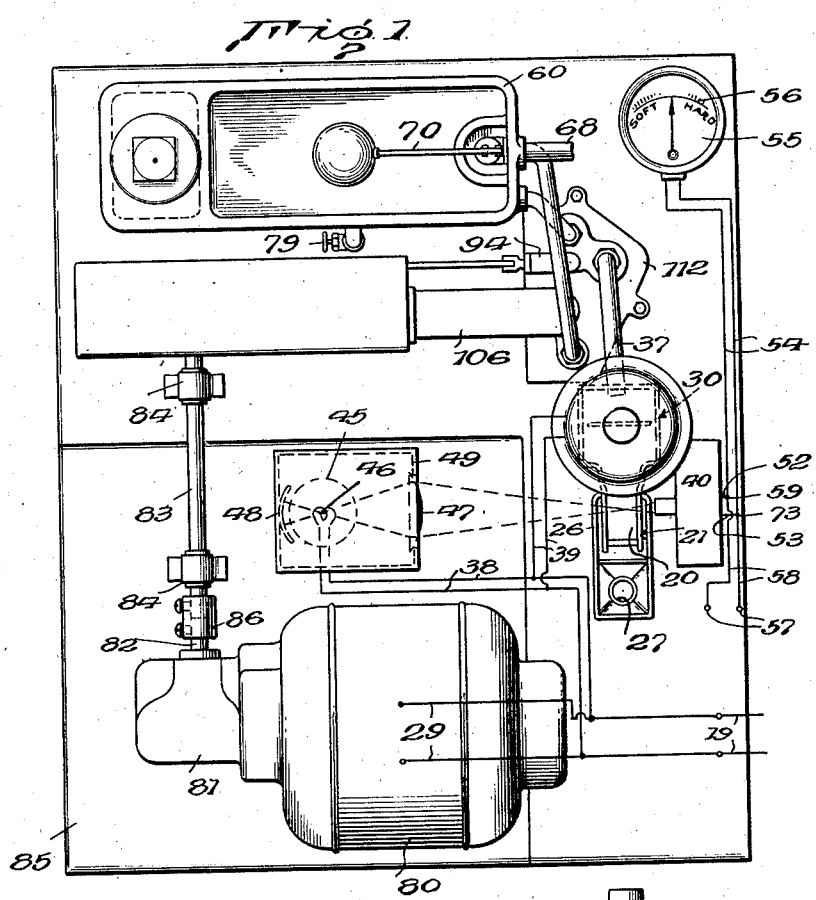
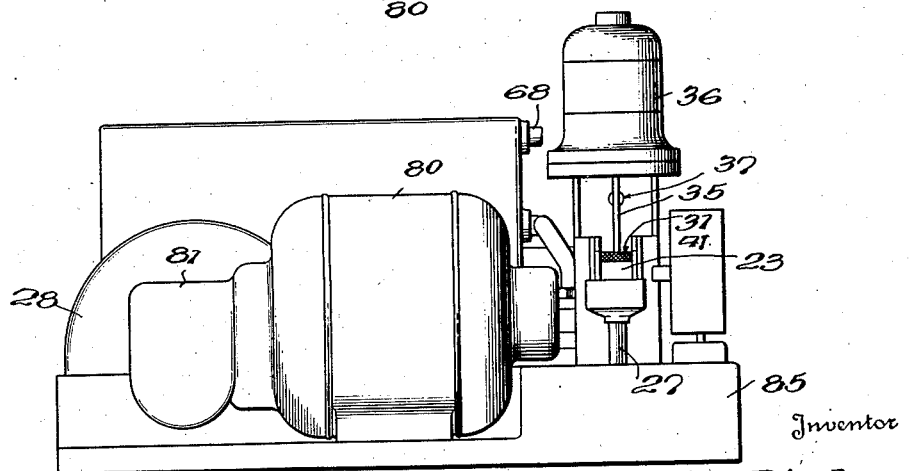
Inventor
Eric Pick,
By K. P. McElroy
Attorney

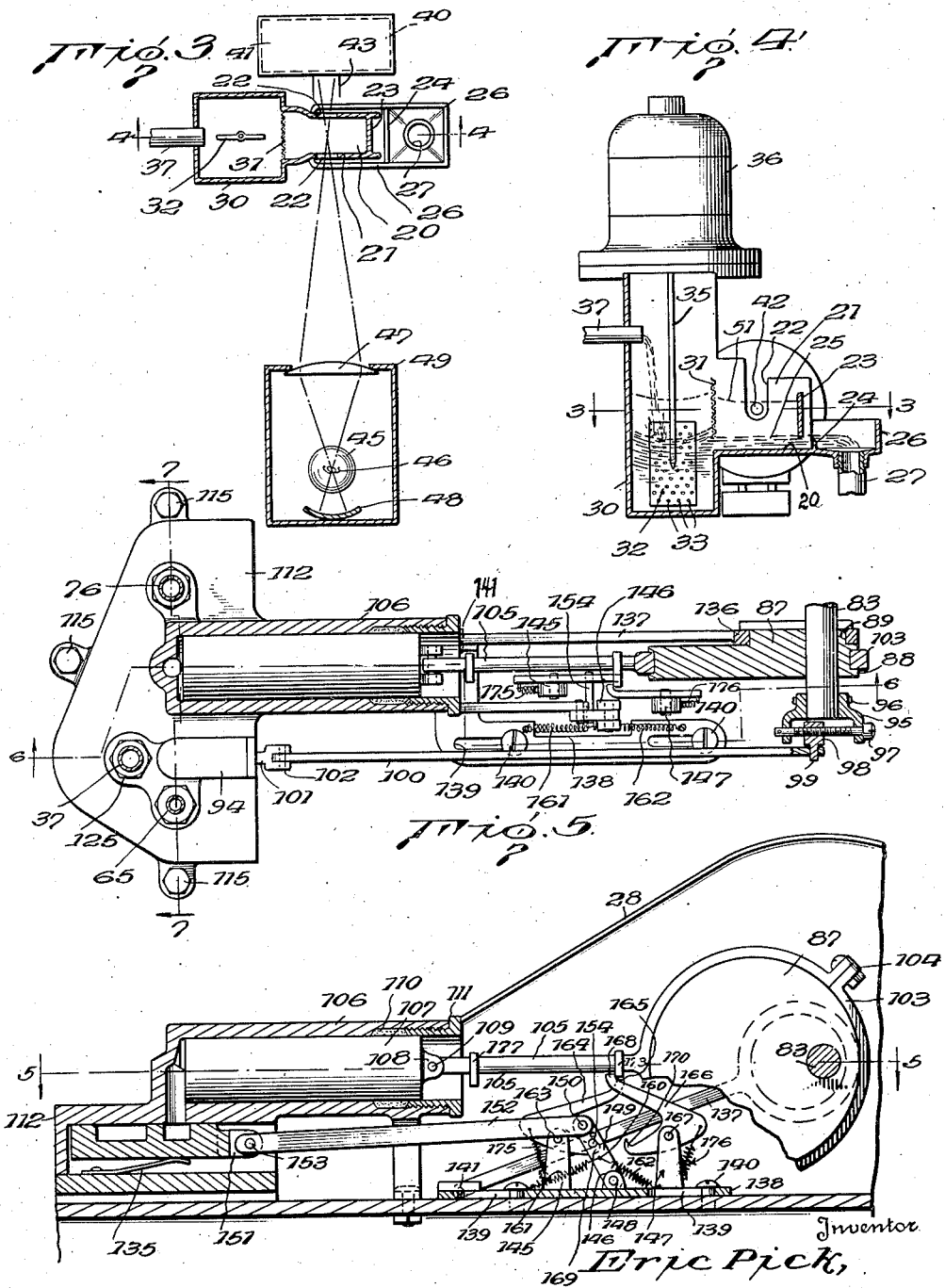

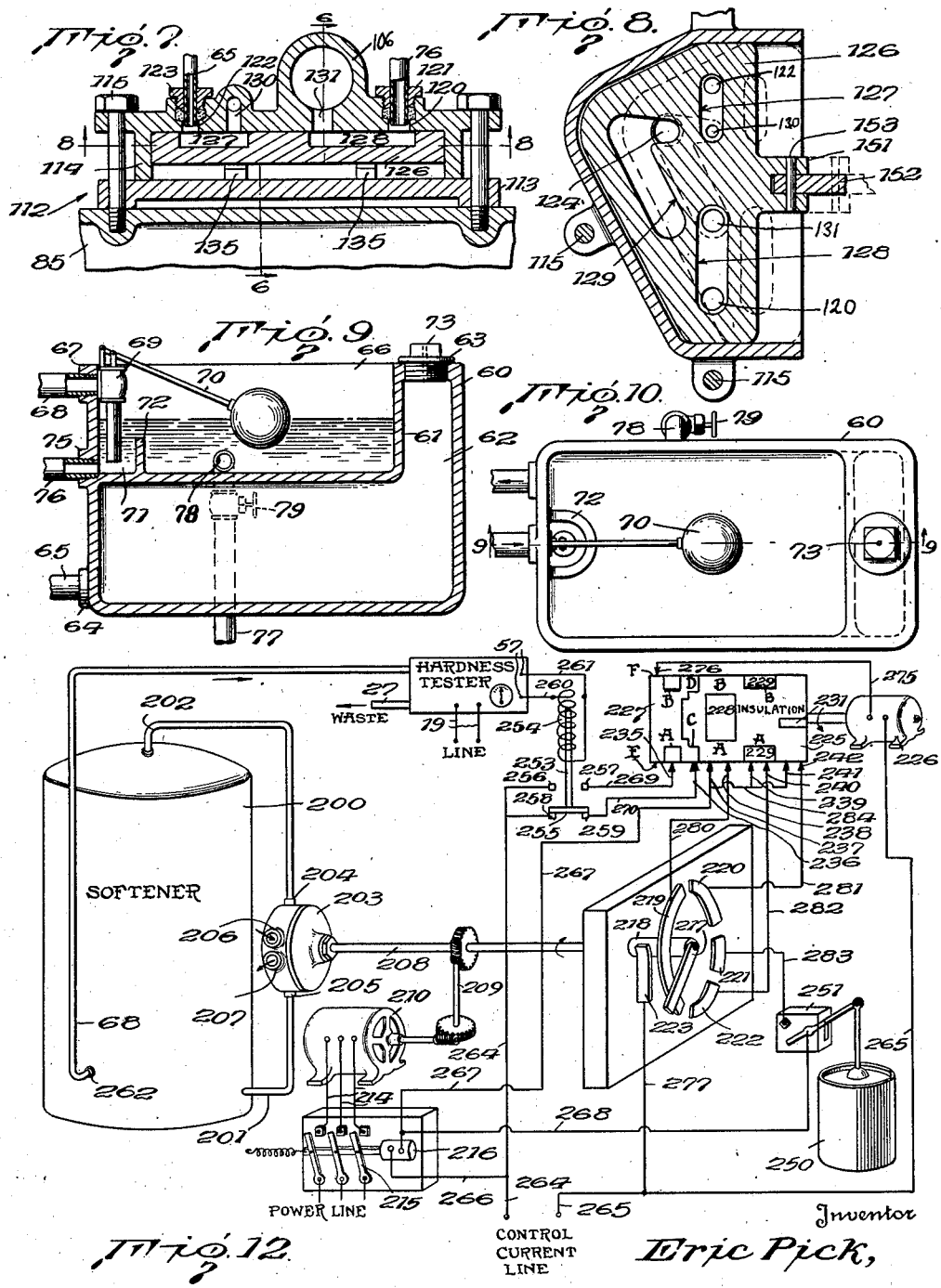

July 5, 1938.  E. PICK  2,122,824
HARDNESS TESTING IN WATER SOFTENERS
Filed Nov. 22, 1935   4 Sheets-Sheet 4

Inventor
Eric Pick,
By K. P. McElroy
Attorney

UNITED STATES PATENT OFFICE 2,122,824

HARDNESS TESTING IN WATER SOFTENERS

Eric Pick, New York, N. Y., assignor to The Permutit Company, New York, N. Y., a corporation of Delaware Application November 22, 1935, Serial No. 51,157

9 Claims. (Cl. 23—230)

This invention relates to hardness testing in water softeners; and it comprises apparatus for producing an electrical indication dependent upon hardness in water, comprising a source of light, a photoelectric cell opposed thereto, a trough therebetween, the sides of which lie below the source and the cell so as not to obstruct illumination on the cell, means for mixing water with soap solution in predetermined proportions, means for agitating such mixture to form a lather of large volume when the water is soft and curds of less volume when the water is hard, means for passing the mixture into the trough so as to cause any lather formed to flow above the sides of the trough and to obstruct the light from the source, and an electrical instrument of the galvanometer or relay type in circuit with the photoelectric cell and adapted to respond to changes in illumination thereon and thus to respond to hardness changes; and to signal the occurrence of hardness in water being softened or to start regeneration of a motorized softener in automatic response to the hardness; and it further comprises a method of testing water for hardness which comprises mixing water and soap solution with excess air and passing the aerated mixture in such relation to a beam of light as to diffuse the beam when soft-water lather is present and not to diffuse the beam when lather is absent, and photometering the beam; all as more fully hereinafter set forth and as claimed.

In conventional zeolite water softening practice, raw water of varying hardness is passed through a bed of base exchange materials (zeolites) containing exchangeable sodium whereby calcium (or magnesium) hardness is exchanged for sodium and an effluent water of zero hardness is obtained. In the course of time, the zeolites lose all, or most, of their exchangeable sodium, this being replaced by calcium from the water. The water softening operation is then stopped and the zeolites are regenerated by passing brine (a solution of NaCl) through the bed. The zeolites take up sodium from the brine and form calcium chlorid solution which is passed to waste. When the softening is by downward flow, it is usual, prior to the brining operation to subject the zeolite bed to a backwashing operation to free it of deposited foreign matter. After the brining operation, residual brine is rinsed from the bed with water.

There has recently been developed improved apparatus for automatically regulating the serial operations of softening, backwashing, brining and rinsing. Usually, the termination of the softening stage is set, not directly according to appearance of hardness in the effluent water or imminent appearance thereof, but, instead, is determined according to gallonage passed; by a volumetric water meter. There is first found by experiment the quantity of water of a given hardness which can be softened by the bed, and the apparatus is set to stop the water softening operation when this quantity has been passed. The meter control setting can be adjusted manually when the water changes in hardness. This type of apparatus is very satisfactory as regards dependability and freedom from the necessity of supervision. However, it works without waste only when the meter control is accurately adjusted to the amount of hardness in the raw water and when the hardness does not vary.

The hardness of many supplies of raw water is by no means constant. For example, municipal water supply systems are often fed from a large lake or open reservoir. A heavy rain or snow fall adjacent the lake may be sufficient to reduce the hardness of the water considerably within a period of 24 hours. Many water supply systems are subject to variation of hardness periodically throughout the year. Ordinarily, hardness is greater in the dry season and less in the wet season.

Attempts, more or less successful, have been made to test for small amounts of hardness in water and to automatically control the operation of water softening according to hardness appearing in the softened water. Use of the difference in conductivity between hard water and soft water is known. The most reliable indication of degree of hardness is the well known soap test. A sample of the water is shaken up with gradually increased dosages of a soap solution of known strength. Any hardness present in the water sample reacts immediately with the soap to form insoluble curds; calcium or magnesium soaps. A small quantity of soap solution added to the sample after all its hardness has combined with the soap will then form a lather upon agitation or shaking, which indicates the end point of the test. The hardness of the water sample is then computed from the quantity of soap solution required to form a lather.

There has been developed an automatic indicator and controller wherein a mixture of the water under test, and soap solution, is passed through a glass cell interposed between a source of light and a photosensitive device. The more the turbidity or curdiness in the water, the less light gets to the photosensitive device. This arrangement is of necessity delicate because there is only a slight difference between the curdiness or transparency of soft water and that of water containing a small amount of hardness. Nevertheless, the arrangement works satisfactorily when the cell glasses are kept clean. But insoluble matter tends to deposit from the water on the glasses and to obstruct the light. This throws off the indication. Considerable attention is required for this type of indicator.

One object achieved in the present invention is the provision of apparatus for giving an electrical indication of a predetermined degree of hardness in water, with the aid of soap solution mixed therewith, the apparatus being so constructed as to eliminate the necessity of providing glass windows between which the water-soap mixture must pass.

Another object is to provide a hardness indicator in which water and soap solution are agitated to form a mixture which is passed into a trough between a source of light and a photoelectric cell, the disposition of the parts being such that when the water is soft and a bulky floating lather is formed, the lather projects above the trough and obstructs the light while, when the mixture is of a curdy nature by reason of hardness in the water, the lather flows along without rising above the sides of the trough and does not obstruct the light. This eliminates the necessity for cell glasses.

Another object is to provide a hardness tester which responds positively to the appearance of a predetermined degree of hardness in the water sample. The change from a small or zero light incidence for soft water to full light incidence for water of a predetermined minimum degree of hardness produces a large and easily measurable change in the output of the photoelectric cell. This makes the apparatus positive in its action and eliminates any loss in accuracy due to changes in photoelectric cell characteristics, etc.

Another object is the provision of apparatus for accurately and uniformly controlling operations of an automatic water softener according to hardness of water at some part in the system, the apparatus not being subject to error due to deposition of matter from the water.

These objects are achieved according to the invention. The invention comprises a source of light, a photoelectric cell opposed thereto, a trough therebetween, the sides of which are so shaped as to be depressed below the beam of light, a dam in the trough, an agitating box provided with a whipper and screen delivering to the trough, and means for supplying the agitator box with samples of water together with soap solution in predetermined proportions. In a modification, compressed air is used for agitation.

In the accompanying drawings are shown examples of two specific embodiments of the invention, including its application to control of a water softener. In the drawings Fig. 1 is a plan view of the indicating apparatus with cover removed;

Fig. 2 is an end view in elevation corresponding to Fig. 1;

Fig. 3 is a diagrammatic plan sectional view taken along line 3—3 of Fig. 4 to illustrate the trough and optical system;

Fig. 4 is an elevational view partly in section taken along line 4—4 of Fig. 3 to show the agitating device and trough;

Fig. 5 is a view taken along line 5—5 of Fig. 6 to show the pumping and sampling mechanism;

Fig. 6 is a view in sectional vertical elevation taken along line 6—6 of Fig. 5;

Fig. 7 is a section taken along line 7—7 of Fig. 5;

Fig. 8 is a plan sectional view taken along line 8—8 of Fig. 7 to show the valve;

Figs. 9 and 10 are views in vertical section and plan, respectively, of the container for soap and water, Fig. 9 being a section on the line 9—9 of Fig. 10;

Fig. 12 is a diagrammatic view showing the application of the invention to a control system for an automatic water softener.

Figure 11:
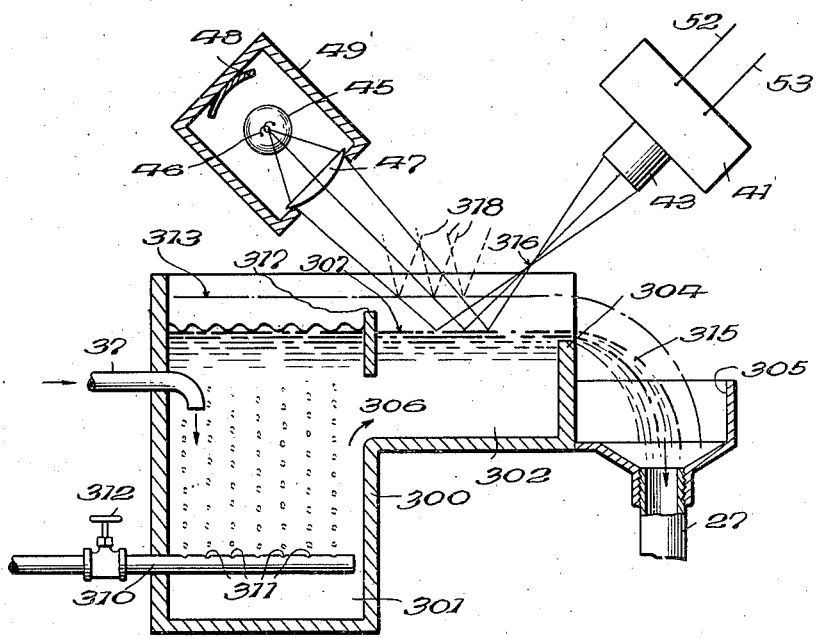
Fig. 11 is a diagrammatic view partly in vertical section and partly in elevation, of a modification using compressed air for agitation.

In the showings, in which like reference characters indicate like parts throughout, the apparatus is shown as comprising a trough 20 having sides 21 and two U-shaped slots 22, an end dam 23 and a weir 24 (Figs. 1 to 4). The trough is adapted to contain a flowing soap-water mixture 25 which runs over weir 24 to waste receptacle 26 communicating with a waste pipe 27. Receptacle 26 surrounds the end and sides of the trough, 25 as shown (Figs. 1 and 3). The trough is supplied with soap-water mixture from an agitating box 30 in direct communication with the trough through a screen 31 and having an agitating device comprising a blade 32 with a number of perforations 33, mounted on a shaft 35 driven by a vertical motor 36 at high speed. The box 30 is mounted on the base 85 of the apparatus. The box is supplied with a mixture of soap and water through a pipe 37. On one side of the trough 20 is mounted a photoelectric cell 40 in a suitable casing 41 having an opening 42 surrounded by a light shield 43 to cut off extraneous light. The photoelectric cell can be of any suitable type. For example, alkali or alkali-metal cells, either of the vacuum type or gas filled, these types being used with an amplifier; or photoelectrolytic cells or those of the dry copper oxid type, both of which can be used to operate sensitive instruments directly. At the present time, I regard as the most suitable cell for my purposes one of the dry copper oxid type. On the other side of the trough is positioned a source of light in the form of a small electric bulb 45 having a concentrated filament 46. The apparatus can be arranged so that light from the bulb falls directly on the photoelectric cell, but it is better to provide concentrating apparatus. Thus, a condensing lens 47 is mounted in front of the bulb so as to focus the rays approximately in the center of the trough. A spherical or concave mirror 48 is positioned behind the bulb to increase the illumination effect of filament 46. The bulb, lens and mirror are enclosed in a covered light-proof box 49. Filament 46 and agitator motor 36 are supplied with current through wires 38 and 39, leading from a power line 19, as shown.

In operation, assuming that box 30 is being supplied with soap and water (by means to be described), the mixture is whipped by blade 32 into a froth or lather containing air bubbles. The lasting quality of the lather depends upon the hardness of the water. Soft water on agitation with soap forms a relatively long lasting and bulky lather, while hard water merely forms a compact curd suspension from which the air bubbles escape immediately after agitation so that the outflowing mixture has substantially no greater volume than it had prior to agitation. The lather formed with soft water flows into the trough (20) through screen 31, which allows only fine bubbles to pass. It serves, so to speak, as a strainer for the lather. Assuming the water is soft, a bulky lather flows into the trough, and out, mostly through the U-shaped depressions or slots 22 and the space between dam 23 and weir 24. The mass of lather existing between the U-shaped overflow cuts down light and accordingly, the photoelectric cell gives a low or zero current. Dam 23 helps hold the mass of lather in the trough when lather is present. The approximate upper level of froth in the trough when the water is soft is indicated by the dotted line 51 in Fig. 4.

On the other hand, when the water is hard, the mixture whipped up by the agitator is a liquid curd suspension. It flows along the bottom of the trough as indicated in full lines in Fig. 4, below screen 31, leaving the U-shaped slots 22 open. Any lather present in the trough is rapidly carried away by the hard water flowing through the trough. Only part of the hardness of this water having reacted with the soap supplied to the mixture, the remaining hardness reacts with the lather and transforms it to curds which are carried away by the outflowing mixture. Light falls unobstructedly on the photoelectric cell which develops a current. Electrical connection is made to the cell through wires 52 and 53. These wires are connected by wires 54 to an indicator 55 of the galvanometer type, conveniently a milliammeter, having a scale 56 and the legends "Soft" and "Hard", as shown. A pair of binding posts 57 is provided connected by wires 58 in parallel with the meter, connection being made to wires 52 and 53 as at 59 and 73. The binding posts are for optional connection to a relay and control system, described post.

While I have found a motor driven agitator blade most satisfactory, in lieu of this agitating means compressed air, from a compressed air system available in many plants or from a separate compressor, may be introduced into the bottom of box 30 for the purpose of agitating the mixture and producing a lather if the water is soft.

In a modification the source of light and the photoelectric cell may be so arranged relative to the mixture in the trough that the light rays from the source are projected at an angle toward the surface of the liquid in the trough to be reflected by the surface toward the cell when the water is hard. Then, with soft water, the lather floating on the surface of the liquid diffuses the light and deflects it from the photoelectric cell and this reduces the effective illumination on the photoelectric cell.

Turning now to the apparatus for supplying the agitator box with a predetermined mixture of soap and water, these means comprise a float box control for water and a reservoir for soap. These are combined in a duplex tank 60, shown in detail in Figs. 9 and 10. The tank has a dividing wall 61 defining a chamber 62 for soap solution, having a removable filling plug 63 vented as at 73 and an outlet 64 in communication with soap pipe 65; and an upper open float compartment or chamber 66 for water to be tested. Tank 66 is supplied with water through an inlet 67 in communication with a sampling conduit 68. Ordinarily, water flows into the tank by hydrostatic pressure, but auxiliary pump means can be provided if required. A float valve control is provided having a float valve 69 operable by a float 70 and delivering into a pocket 71 formed by a dam 72. The pocket has an outlet 75 in communication with a conduit 76 leading to the water pump, to be described. The pocket retains a small quantity of the latest or freshest sample of water. In order to shorten the time lag of the apparatus, an excess of water is taken from the system beyond the requirements of the sampling apparatus. This excess is allowed to flow off through waste pipe 77 in communication with the float compartment through outlet 78. A valve 79 in the waste pipe can be adjusted to control the rate of discharge. The float valve operates to maintain a constant water level in compartment 66.

Water and soap solution are supplied from tank 60 to box 30 in predetermined proportions with the aid of two proportioning pumps. These are illustrated in detail in Figs. 5 to 8. A motor 80 (Figs. 1 and 2) is provided having speed reducing mechanism 81 with power shaft 82, the reduction being such as to cause the power shaft to rotate several times a minute. The motor can be of very small size; a small fraction of a horsepower. It is supplied with current through wires 29 connected to wires 19, as shown. Power shaft 82 drives a shaft extension 83, mounted in bearings 84 supported on the base 85 of the apparatus, a coupling 86 between the two shafts being provided.

A double eccentric 87 is mounted on shaft 83. The eccentric has two circular rims 88 and 89. Eccentric rim 88 is provided for operating the water pump. For operating the soap pump, there is provided an eccentric device adjustable as to stroke. This comprises a collar 95 pinned to the end of shaft 83 by pin 96 and having a screw 97 pivotally mounted in the collar 95, carrying a nut 98 having a projecting pin 99 serving as a crank arm. A connecting rod 100 connects pin 99 with the piston 101 of the soap pump through a pivoted joint and pin 102. The piston is housed in a cylinder 94. Eccentric rim 88 is provided with an eccentric-strap 103 fastened as at bolted joint 104 over the rim and having a connecting rod 105. The water pump comprises a cylinder 106 containing a plunger piston 107 having lugs 108, pivoted to the end of rod 105 by a pin 109. Cylinder packing is provided, comprising packing material 110 and stuffing nut 111. Upon rotation of shaft 83, the pistons of the two pumps are oscillated back and forth, in phase.

Below the two cylinders is positioned a valve box 112 having a base plate 113 and a side and top piece 114 (Fig. 7), the assemblage being bolted to the base 85 of the apparatus by a plurality of bolts 115, as shown. Water is delivered to the valve box through pipe 76 delivering into the valve box through a bore 120, a liquid tight connection being made by stuffing nut 121, with appropriate packing. Soap is delivered to the valve box through pipe 65 delivering through a bore 122 sealed by a similar stuffing nut 123. Mixed liquid leaves the box through a bore 124 (Fig. 8), having stuffing nut 125 and pipe 37 leading into the agitating box 30.

In the valve box is a valve slide 126 of irregular shape and provided with three fluid channels, 127, 128, and 129, as shown. A port 130 leads from the soap cylinder into the valve box and another port 131 connects the water cylinder and the valve box. Fig. 8 shows the valve position during the intake strokes of the pumps. In this position, the valve connects the soap solution pipe (65) with the soap pump cylinder (94) through port 122, channel 127 and port 130. The valve also connects the water pipe (76) to the water pump cylinder (106) through port 120, channel 128 and port 131. The outlet pipe 37 is shut off in this position; channel 129 does not connect port 124 with any other port. A pair of springs 135 hold the valve slide tightly against the under face of element 114. The valve slide can be of metal or, in some cases, of hard rubber or of hard rubber backed with metal.

The valve operating linkage is shown in detail in Figs. 5 and 6. The linkage is operated from shaft 83 through eccentric rim 89. An eccentric band 136 encircling the eccentric rim is provided as shown, the band being connected to an arm 137. A sliding plate 138 is mounted on the base of the apparatus, longitudinal slots 139 being formed in the plate surrounding screws 140 which hold the plate to the base in a smooth sliding fit. Rod 137 is pivoted to the offset end of the plate by a pin 141, as shown. Thus rotation of shaft 83 by the motor causes the plate to slide back and forth, in phase with the eccentrics.

Three stationary pedestals, 145, 146, and 147 are fixed on the base of the apparatus. Pedestal 146 has pivoted thereto at 148 a link 149, the other end of which has a pin 150. Pin 150 is connected to a pair of lugs 151 on the slide valve through a connecting rod 152 and a pin 153. Link 149 also has a fixed pin 154 near the upper end thereof. Link 149 also has a pin 160 to which are attached two springs 161 and 162. The other ends of the springs are attached to plate 138 as shown. At the upper end of pedestal 145 is pivotally mounted, as at 163, a latch 164 having a detent portion 165. A similar latch 166 is pivotally mounted as at 167 at the upper end of pedestal 147. This latch has a detent portion 168. The lower portions of the two latches are provided with detent hooks 169 and 170, adapted to grip pin 154 at certain positions. The eccentrics are covered by a housing 28, as shown.

The valve operating mechanism can best be understood by considering the operation of the device. Assuming the motor 80 to be rotating, Figs. 5 to 8 show the apparatus just after the end of the discharge and at the beginning of the intake, of both piston strokes. A mixture of water and soap has just been forced by the pistons through pipe 37 into the agitating box 30 and the valve slide has now moved to cut off this connection and to make connections between the sources of water and soap solution and the water cylinder and soap cylinder, respectively, as described in connection with Fig. 8. As the shaft 83 rotates clockwise the pistons move to the right, sucking soap solution and water into the two pump cylinders through the connections as described in connection with Fig. 8.

As the pistons near the outer end of the suction stroke, collar 177 carried on connecting rod 105 strikes the detent portion 165 of latch 164 and starts to rotate the latch about the pin 163. At this time connecting arm 137 has moved to the extreme right thus sliding plate 138 to the extreme right and placing spring 162 under tension and relieving spring 161 of tension. At outer dead center collar 177 has moved detent portion 165 so as to release hook 169 from pin 154. The tension of spring 162 causes link 149 to snap about pivot 148 to the right until pin 154 engages hook 170 in latch 166. The link in changing position moves connecting rod 152 to the right and thus shifts the valve slide to the extreme right. This positions the valve slide for discharge of soap solution and water from the cylinders. This valve position is indicated by dotted lines in Fig. 8. Pin 154 engaging the hook on latch 166 holds the valve mechanism in fixed position during the discharge stroke which immediately ensues. The two cylinders are now filled with soap solution and water. As the shaft rotates beyond outer dead center, the pistons are forced inward, thereby forcing soap and water into pipe 37. Latch 164, after it has released pin 154, is brought back to normal position by the action of spring 175.

As the pistons approach the end of the discharge stroke, collar 178 on connecting rod 105 engages the detent end 168 of latch 166 rotating the latch about pivot 167. At this time connecting arm 137 has moved plate 138 to the left, placing spring 161 under tension and releasing tension from spring 162. At inner dead center, the end of the discharge stroke, collar 178 has rotated latch 166 sufficiently to release pin 154 from hook 170. Under the tension of spring 161 link 149 rotates swiftly until pin 154 engages hook 169 in latch 164. The shift in position of link 149 moves the slide valve to the extreme left, positioning the valve for introduction of soap and water to the cylinders. The position shown in Figs. 5 to 8 is thus resumed. Latch 166 is returned to normal position by spring 176 after it has released pin 154.

While an aqueous soap solution can be used, I find it is better to use a concentrated alcoholic solution of soap. Any common soda or potash soap is suitable. The soap chamber 62 in tank 60 is sealed by cap 63 to prevent evaporation of the alcohol. The adjustment of screw 97 (Fig. 5) determines the relative proportions of soap solution and water which are fed to the agitator box. It is a simple matter to adjust this screw so as to make the apparatus respond to any degree of hardness desired.

In Fig. 11 I have shown a modification of the device which has advantages in certain relations. Compressed air is used for agitating in lieu of a mechanical whipper. As shown, there is provided a box 300 of irregular shape, having a well 301 and a lateral extension 302. The top of the box is open, as shown. A depressed weir 304 is provided, and below it a waste box 305 delivering to waste conduit 27 as shown. The box is adapted to contain a body of soap-water mixture 306, the upper level of which in the case of hard water is indicated at 307. A mixture of soap and water is delivered to the box through pipe 37. Pipe 37 leads from proportionating apparatus such as described in connection with the previous figures. Compressed air is supplied near the bottom of the box through a pipe 310 having perforations 311 as shown. Pipe 310 is provided with a control valve 312 and receives compressed air continually from a source, not shown. Air bubbles up through mixture 306 and agitates it thoroughly. The amount of air supplied is in excess of that which the mixture can retain. If the water is soft, there is formed a lather the surface of which is indicated as at 313. If the water is hard the surface remains substantially as shown at 307. The soap-water mixture flows over weir 304 and to waste as indicated at 315.

The compressed air agitating box described is particularly useful with a modification of the invention in which the optical system is a reflection system rather than a transmission system. As shown, light box 49 is mounted so as to direct a beam downward at an angle upon the surface of the soap-water mixture. The photoelectric cell in housing 41 is disposed as shown, to receive light reflected from surface 307. The focus is adjusted so that the rays cross not exactly at the surface but a little beyond, as at 316. This makes the device less sensitive to irregularities in the surface 307. A dam 317 is provided as shown, extending slightly above the normal liquid level in the box. This dam separates the agitated portion in well 301 from the portion in extension 302 and makes for more regular operation.

In operation, soap-water mixture is supplied through pipe 37 substantially as described in connection with previous figures. Compressed air is fed in continuously and agitates the mixture in well 301. While the sampled water is soft, the compressed air causes formation of a lather, as indicated (313). The lather rises above dam 317. Light is no longer reflected into the photoelectric cell, but is dissipated as indicated by broken lines 318. The surface of the lather diffuses the light and moreover the change in level keeps direct reflected rays from getting to the cell. As a result, the cell registers a low or zero current.

When the water becomes hard, the agitation does not result in production of a lather and the surface 307 remains level and clear. The major portion of the beam from the lamp is directed into the photoelectric cell, which produces a current.

The photoelectric cell is connected to the meter and relay switch through wires 52, 53, exactly as described ante in connection with the other figures.

In this modification, as in that of Figs. 1 to 10, the lather when present diffuses the light beam from the source and the photoelectric cell is arranged to photometer the beam and thus to indicate presence of lather which corresponds to softness. When, however, hardness occurs in the sampled water, the lather disappears and the resulting increased photoelectric cell current registers hardness by the galvanometer.

The apparatus is useful as a simple indicator, the ammeter 55 showing whether the water at a given point in the system is soft or hard. The apparatus is also useful for controlling an automatic softener according to hardness; that is, to stop the softening operation and start regeneration when hardness appears at some point in the system. One example of a specific embodiment of the invention as applied to water softener control is diagrammed in Fig. 12.

In Fig. 12 the invention is shown applied to a softener having an automatically actuated and timed multiport valve. The softener proper includes a container 200 for zeolites, having lower connection 201 and upper connection 202. Flows to and from the softener are controlled by a single multiport rotary valve 203 having connections as at 204 and 205 to conduits 202 and 201, and an inlet 206 for raw water and outlet 207 for softened water. The valve has other connections (not shown) for brine and waste. The valve has a stem or shaft 208, adapted to be actuated through reducing gearing 209 by an electric motor 210. The motor current, supplied through wires 214, is controlled by a normally open switch 215 adapted to be closed by energization of a solenoid 216. Upon actuation of the motor the valve is caused to rotate intermittently to fixed angular positions corresponding to the several flows of the regeneration cycle and of softening.

The valve shaft operates a circuit breaker arm 217 mounted on a contact hub 218 fixed to shaft 208. Four arcuate contact elements 219, 220, 221, and 222 are mounted so as to be contacted by arm 217 during its rotation. A brush 223 makes sliding contact with hub 218. The function of the circuit breaker is to cause the valve to assume predetermined angular positions.

The valve operation is timed by a timer comprising an insulating drum 225 carrying contact segments and driven by a constant speed motor 226. The drum is shown developed for the sake of clarity; that is, the cylindrical surface is shown in Fig. 12 as being laid out flat. Actually edge E in the diagram coincides with edge F. The drum has four contact members, 227, 228, 229, and 231. Eight fixed brushes, 235, 236, 237, 238, 239, 240, 241, and 242 engage the surface of the drum as indicated.

A brine tank 250 of conventional form is provided, having a float switch 251 adapted to break contact when the brine tank is full and to make contact when the brine level falls to a predetermined point. Conduit connections from the brine tank to the softener are omitted from the figure for the sake of clarity.

A solenoid switch 253 is provided having a coil 254, a contact arm 255 and four contact points 256, 257, 258, and 259.

The hardness tester is adapted to operate this solenoid switch through wires 260 and 261 connected to binding posts 57 of the hardness tester. The hardness tester takes water samples through sampling pipe 68, the inlet of which is usually positioned adjacent the bottom of the softener as at 262, being shown at a level slightly above that of the outlet connection 201.

The electrical connections for the various elements described are as follows. Control current, which is ordinarily single phase alternating current, is supplied through two wires 264 and 265. A branch 266 leads from wire 264 to one side of solenoid switch 216. The other side of the solenoid is connected through a wire 267 with contact point 237. It is also connected through wire 268 with the brine tank float switch 251. Wire 264 leads directly to contact points 256 and 258 of relay switch 253, as shown. Contact points 257 and 259 of the relay switch are respectively connected directly through wires 269 and 270 to contact points 235 and 236 of timing drum 225. Wire 265 leads to one terminal of timing motor 226. The other terminal of the timing motor is connected through a wire 275 with a contact point 276 engaging contact member 227 of the timing drum. Wire 265 has a branch 277 connected to circuit breaker brush 223. Drum contact points 238, 242, and 240, respectively, are connected to circuit breaker segments 219, 220, and 222 through wires 280, 281, and 282. Segment 221 is connected through a wire 283 with float switch 251. Drum contact points 239 and 241 are connected through a wire 284 with wire 267 as shown.

Considering the operation of this system, when water flowing through the sampling pipe is soft, solenoid 254 remains unenergized in the position shown, making contact between points 258 and 259. The valve shaft 208 is shown in softening position, and it is assumed that the system has just returned to this softening stage and that softened water is flowing from the softener. Switch 215 is open, as shown; the valve operating motor is not running. The timing circuit is completed through wire 264, points 258 and 259, wire 270, point 236, segment 227, point 276, wire 275, timing motor 226 and wire 265. Thus the motor is caused to turn the drum. Drum 225 turns until the circuit is broken by segment 227 moving from contact point 236 at edge C. At this point motor 226 stops. In the meantime, contact 235 and edge A of segment 227 have made contact; but the circuit is open at contact points 256 and 257. Hence drum 225 remains stationary. The softening operation continues until hard water appears in the water sample. The drum speed and contact positions are so adjusted that the timing motor comes to a stop as described some time prior to appearance of hardness. Thus the hardness tester is what actually initiates regeneration. Upon appearance of hardness, relay switch 253 is energized by the hardness tester, breaking connection between points 258 and 259 and making connection between points 256 and 257. During the transition period while the water changes from soft to hard, there occurs alternate rising and falling of the lather, which causes varying illumination on the photoelectric cell and thereby fluctuations in the cell output. This causes the relay switch to flutter. This condition lasts only a short time but it is desirable to delay initiation of regeneration until conditions become steady. Each time contact is made through points 256 and 257 during the flutterings, the timing circuit is completed through point 235, segment 227, point 276, wire 275 and the motor. Thus the motor is caused to operate, intermittently advancing the drum.

Regeneration is initiated when contacts 237 and 238 come in contact with edge A of segment 228 and a control circuit is thereby completed through wire 265, wire 277, brush 223, hub 218, arm 217, arcuate segment 219, wire 280, point 238, segment 228, point 237, wire 267, solenoid switch 216, wire 266 and wire 264. Thus switch 216 closes and turns on motor 210. The motor rotates the valve until arm 217 leaves strip 219, thus breaking the circuit, and engages segment 220. This angular position corresponds to backwashing position of the valve. The valve motor stops. The timing motor 226 however remains energized and continues turning the drum. Backwashing continues until segment 231 on the timing drum closes points 241 and 242. The duration of the backwashing step can be varied by adjusting the circumferential position of segment 231. A control circuit is thus completed through wire 265, wire 277, arm 217, segment 228, wire 281, points 241 and 242, wire 284, wire 267, solenoid switch 216, wire 266 and wire 264. The motor 210 now turns the valve shaft until arm 217 leaves segment 220, engaging segment 221; leaving the shaft 208 at an angular valve position corresponding to brining position.

Brine now flows from tank 250 into the softener. When a predetermined quantity of brine has been withdrawn float switch 251 closes. This completes a control circuit through wire 265, wire 277, brush 223, arm 217, segment 221, wire 283, switch 251, wire 268, solenoid switch 216, wire 266 and wire 264. The valve motor is thereby started and turns the valve until arm 217 leaves strip 221 for strip 222, at an angular valve position corresponding to rinsing. Rinse water passes into the softener to displace brine from the zeolites prior to a new softening stage.

In the meantime, timing motor 226 has stopped, after rotating drum 225 to such position that contact 235 disengages edge B of segment 227, which breaks the circuit through the timing motor, and contact 236 has made contact with edge D of segment 227. Also, contacts 237 and 238 have cleared edge B of segment 228, contacts 241 and 242 are no longer in contact with segment 231 and contacts 239 and 240 have not yet engaged the edge B of segment 229.

At the end of the rinsing operation, the effluent water from the softener changes gradually from hard to soft. This is accompanied by alternate rising and falling of lather. In order to delay return to softening until a smooth and continuous lather appears in the trough, the edge B of segment 229 and edges B and D of segment 227 have a short circumferential gap between them. Thus, during the change the fluttering of relay switch 253 causes contacts 258 and 259 to be closed intermittently, permitting the timing motor to advance drum 225 stepwise. When the softener has been fully rinsed and the effluent is soft, relay 253 is de-energized and makes steady connection across contact points 258 and 259. After a small advance of the drum 225, points 239 and 240 make contact with edge B of segment 229. The control circuit is now completed through wire 265, wire 277, brush 223, arm 217, segment 222, wire 282, contacts 239 and 240, segment 229, wire 284, wire 267, solenoid switch 216, wire 266 and wire 264. The valve motor is thus caused to turn the valve until arm 217 slides off segment 222 and on to segment 219. This breaks the switch for the valve motor and the motor stops, leaving the parts in the position indicated in Fig. 11. The timing circuit is now closed through wire 264, points 258 and 259, wire 270, point 236, segment 227, point 276, wire 275, motor 226 and wire 265. The timing motor runs until segment 227 breaks contact with point 236 at edge C, as described.

The hardness tester can also be applied to any other softener of the automatic type adapted to initiate regeneration by opening or closing of an electric relay switch, the hardness tester serving in lieu of manual or water meter actuation.

The elements of the hardness tester which come into contact with water or soap solution are advantageously made of bronze or stainless steel.

What I claim is:—

1. Apparatus for producing an electrical indication dependent upon hardness in water, comprising a source of light, a photoelectric cell opposed thereto and receiving a beam of light therefrom, means for mixing water with soap solution in predetermined proportions and for agitating the mixture, a container in communication with said mixing means and adapted to contain a flowing stream of said soap and water mixture, said container being so located with respect to the source of light and the cell and having walls so arranged that when the mixture forms a voluminous lather due to soft water the lather in the container diverts the light beam from the cell and thus causes a low degree of illumination on the cell, and when the mixture forms no lather it flows along between the walls of the container without diverting said light beam and thus provides for a high degree of illumination on the cell, and an electrical instrument in circuit with the cell and adapted to respond to changes in illumination thereon and thus to hardness changes.

2. Apparatus for producing an electrical indication dependent upon hardness in water, comprising a source of light, a photoelectric cell opposed thereto, a container adapted to hold a body of lather and having sides depressed below the line between the source and the cell so as not to obstruct illumination on the cell, means for mixing water with soap solution in predetermined proportions, means for agitating such mixture and means for delivering the mixture to the container so that any lather formed extends above the depressed sides of the container and when no lather is formed the mixture does not extend above said depressed sides, and an electrical instrument in circuit with the photoelectric cell and adapted to respond to changes in illumination thereon and thus to respond to hardness changes.

3. Apparatus for producing an electrical indication of hardness in water, comprising a source of light, a photoelectric cell opposed thereto, and an electrical indicating meter electrically connected to the cell, a container between the source of light and the cell, the container having depressed portions lying below the line between the source and the cell so as not to obstruct illumination on the cell, means for mixing water with soap solution in predetermined proportions, means for agitating such mixture and feeding it to the container to form a lather of large volume extending above the depressions of the container when the water is soft and to form curds of less volume not extending above such depressions when the water is hard, so that variations in hardness of the water are reflected as variations in illumination on the cell.

4. Apparatus for producing a power impulse dependent upon hardness in water, comprising a source of light, a photoelectric cell opposed thereto, a container therebetween having sides which are depressed below the line between the source and the cell so as to expose the cell to the source, means for mixing water with soap solution in predetermined proportions, means for agitating such mixture to form a lather of large volume extending above the sides of the container when the water is soft and a curd of less volume not extending above the sides when the water is hard, so that illumination on the cell is varied with hardness of water, and an electrical relay in circuit with and operable by the cell and adapted to respond to variations in cell current.

5. Apparatus for producing an electrical indication dependent upon hardness in water, comprising a source of light, a photoelectric cell opposed thereto, a container therebetween adapted to hold a body of lather and having sides which are depressed below the line between the source and the cell so as to expose the cell to the source, means for mixing water with soap solution in predetermined proportions, said means comprising a motor, a reciprocating pump for water driven thereby, a reciprocating pump for soap solution also driven by the motor, said pumps being adapted to perform suction and discharge strokes, conduit means connecting the water pump with a source of water to be tested and conduit means for admitting soap solution to the soap pump, joint conduit means delivering from the two pumps, valve means for alternately connecting the source of water and soap solution to the pumps at the beginning of the suction stroke and connecting the pumps with the joint outlet conduit at the beginning of the discharge stroke, means for delivering the mixture of soap and water to the container in the form of a bulky lather or a curdy liquid depending upon the hardness of the water and an electrical indicating instrument in circuit with the photoelectric cell.

6. A hardness testing apparatus comprising a mixing chamber, a water supply pipe delivering to the mixing chamber, means for controlling the rate of flow of water delivered to the mixing chamber, means for supplying soap solution to the mixing chamber and for controlling the rate at which the soap solution is supplied, means for introducing air bubbles in the liquid contents of the mixing chamber, trough means providing an overflow for the mixing chamber, a source of light, means for projecting a beam of light from said source towards the mixture at a level above said overflow, a light sensitive cell in the path of said beam, the cell, source of light and trough means being so arranged that upon occurrence of lather the light beam is diffused and lessened in intensity before it reaches the cell, and measuring means electrically connected to the light sensitive cell.

7. Apparatus for producing an electrical impulse dependent upon hardness in water, comprising a source of light, a photoelectric cell opposed thereto and receiving a beam of light therefrom, means for mixing water with soap solution in predetermined proportions and for agitating the mixture, a container in communication with said mixing means and adapted to contain a flowing stream of said soap and water mixture, said container being so located with respect to the source of light and the cell and having walls so arranged that when the mixture forms a voluminous lather due to soft water the lather in the container diverts the light beam from the cell and thus causes a low degree of illumination on the cell, and when the mixture forms no lather it flows along between the walls of the container without diverting said light beam and thus provides for a high degree of illumination on the cell, an electrically operable relay switch in circuit with the cell and adapted for actuation by the cell, an electric motor, multiple contact switching means driven by the motor, and appropriate electric power circuits for the motor, the relay switch and the switching means, the relay switch being connected into the circuits in such manner that upon appearance of hardness the switch moves to close a circuit through the motor.

8. An optical method of testing water for hardness which comprises mixing a stream of water to be tested and a stream of soap solution with air, flowing said aerated mixture as a stream, directing a beam of light across and above said stream in such relation with respect to said stream that the beam is undiffused when the aerated mixture is free of lather, while when the aerated mixture forms a lather due to soft water the beam is diffused by said lather and lessened in intensity, and measuring the intensity of said beam photoelectrically.

9. Hardness testing apparatus comprising a photoelectric cell, a receptacle, means for supplying water thereto, means for mixing soap with the water in predetermined proportions to produce a lather when the water is soft, the receptacle being arranged to permit the lather to collect in a predetermined position, and a source of light for the photoelectric cell so arranged with respect to it and to said receptacle, that when no lather is produced the light source illuminates the cell and when lather is produced and reaches said predetermined position it lies in the path of light rays from the source to the cell and obstructs the light.

ERIC PICK.